(12) United States Patent
Pathuvoth (10) Patent No.: US 12,276,260 B1
(45) Date of Patent: Apr. 15, 2025

(54) PITCH ASSEMBLY FOR A WIND TURBINE HAVING MINIMIZED MICRO-PITCHING

(71) Applicant: General Electric Renovables Espana, S.L., Barcelona (ES)

(72) Inventor: Dhanesh Chandrashekar Pathuvoth, Bengaluru (IN)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 18/519,433

(22) Filed: Nov. 27, 2023

(51) Int. Cl.
| F03D 7/02 | (2006.01) |
| F03D 15/00 | (2016.01) |
| F16H 55/06 | (2006.01) |
| F16H 55/18 | (2006.01) |
| F16H 57/12 | (2006.01) |

(52) U.S. Cl.
CPC ........... *F03D 7/0224* (2013.01); *F03D 15/00* (2016.05); *F16H 55/06* (2013.01); *F16H 55/18* (2013.01); *F16H 57/12* (2013.01); *F05B 2260/4031* (2013.01); *F16H 2057/123* (2013.01)

(58) Field of Classification Search
CPC .. F05B 2260/4031; F16H 55/06; F16H 55/18; F16H 57/12; F16H 2057/125; F03D 7/0224
See application file for complete search history.

(56) References Cited

U.S. PATENT DOCUMENTS

| 4,184,380 A * | 1/1980 | Rivin | F16H 55/16 |
| | | | 74/464 |
| 7,261,517 B2 * | 8/2007 | Uphues | F03D 7/0268 |
| | | | 416/155 |
| 7,828,686 B2 | 11/2010 | Aiyakkannu | |
| 8,371,976 B2 * | 2/2013 | Watanabe | F16H 57/12 |
| | | | 475/5 |
| 9,719,492 B2 * | 8/2017 | Pasquet | F03D 7/0224 |

FOREIGN PATENT DOCUMENTS

| EP | 2410175 A1 | 1/2012 | |
| GB | 2569415 A * | 6/2019 | ............... F03D 7/02 |

* cited by examiner

*Primary Examiner* — Justin D Seabe
(74) *Attorney, Agent, or Firm* — Dority & Manning, P.A.

(57) ABSTRACT

A pitch assembly for a wind turbine includes a pitch bearing comprising an inner race, an outer race, and a plurality of gear teeth arranged on one of the inner race or the outer race. The pitch assembly further includes a pitch drive mechanism having a pitch drive motor and a primary pitch drive pinion. The primary pitch drive pinion is configured to rotate one of the inner race or the outer race of the pitch bearing about a pitch axis by engaging with a first set of the plurality of gear teeth. The pitch assembly also includes a secondary pinion engaging a second set of the plurality of gear teeth. The secondary pinion is constructed of a deformable material such that backlash is eliminated between the secondary pinion and the plurality of gear teeth, thereby minimizing micro-pitching of the pitch assembly.

17 Claims, 9 Drawing Sheets

PITCH ASSEMBLY FOR A WIND TURBINE HAVING MINIMIZED MICRO-PITCHING

FIELD

The present disclosure relates generally to wind turbines and, more particularly, to pitch assemblies for wind turbines and related methods that minimize micro-pitching.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and rotatable hub having one or more rotor blades mounted thereto. The rotor blades capture kinetic energy of wind using known airfoil principles. For example, the rotor blades typically have the cross-sectional profile of an airfoil such that, during operation, air flows over the rotor blades producing a pressure difference between the sides. Consequently, a lift force, which is directed from a pressure side towards a suction side, acts on each of the rotor blades. The lift force generates torque on the main rotor shaft, which is typically geared to the generator for producing electricity.

At least some known wind turbines also include a pitch assembly having a pitch bearing coupled between one of the rotor blades and the hub, and a pitch drive mechanism for use in positioning the rotor blade attached to the pitch bearing. Accordingly, the pitch assembly is operated to adjust the pitch of the rotor blade. In particular, the pitch bearing includes gear teeth that engage the pitch drive mechanism for rotation of the rotor blade about a pitch axis. Backlash (i.e., clearance between mating components) is required between the pitch drive pinion and the gear teeth per assembly instruction of the pitch assembly. Such backlash, however, can cause micro-pitching, which causes damage to the pitch bearing. These micro-movements cannot be eliminated by the turbine control system.

Accordingly, the present disclosure is directed to a pitch assembly and method for preventing micro-pitching in a pitch assembly of a wind turbine.

BRIEF DESCRIPTION

Aspects and advantages of the present disclosure will be set forth in part in the following description, or may be obvious from the description, or may be learned through practice of the present disclosure.

In an aspect, the present disclosure is directed to a pitch assembly for a wind turbine. The pitch assembly includes a pitch bearing comprising an inner race, an outer race, and a plurality of gear teeth arranged on one of the inner race or the outer race. The pitch assembly further includes a pitch drive mechanism having a pitch drive motor and a primary pitch drive pinion. The primary pitch drive pinion is configured to rotate one of the inner race or the outer race of the pitch bearing about a pitch axis by engaging with a first set of the plurality of gear teeth. The pitch assembly also includes a secondary pinion engaging a second set of the plurality of gear teeth. The secondary pinion is constructed of a deformable material such that backlash is eliminated between the secondary pinion and the plurality of gear teeth, thereby minimizing micro-pitching of the pitch assembly.

In another aspect, the present disclosure is directed to a method of minimizing micro-pitching of a pitch assembly of a wind turbine. The method includes securing a pitch bearing having an inner race, an outer race, and a plurality of gear teeth arranged on one of the inner race or the outer race to a hub of the wind turbine. The method further includes securing a pitch drive mechanism having a pitch drive motor and a primary pitch drive pinion to the hub such that the primary pitch drive pinion engages with a first set of the plurality of gear teeth. Further, the method includes engaging a secondary pinion with a second set of the plurality of gear teeth. The secondary pinion is constructed of a deformable material. Moreover, the method includes rotating one of the inner race or the outer race of the pitch bearing about a pitch axis via the pitch drive mechanism, wherein the deformable material allows the secondary pinion to rotate without backlash between the secondary pinion and the plurality of gear teeth, thereby minimizing micro-pitching of the pitch assembly.

In yet another aspect, the present disclosure is directed to a pitch drive mechanism for a wind turbine. The pitch drive mechanism includes a pitch drive motor, a primary pitch drive pinion configured to rotate one of an inner race or an outer race of a pitch bearing about a pitch axis by engaging with a first set of a plurality of gear teeth of one of the inner race or the outer race, and a secondary pinion configured to engage a second set of the plurality of gear teeth. The secondary pinion is constructed of a deformable material such that backlash is eliminated between the secondary pinion and the plurality of gear teeth, thereby minimizing micro-pitching of the pitch assembly.

These and other features, aspects and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

Generally, the present disclosure is directed to a pitch assembly for a wind turbine that utilizes a secondary pinion mounted on a hub of the wind turbine. The pitch assembly includes a pitch bearing having an inner race, an outer race, and a plurality of gear teeth arranged on one of the inner race or the outer race. Further, the pitch assembly includes a pitch drive mechanism having a pitch drive motor and a primary pitch drive pinion configured to rotate one of the inner race or the outer race about a pitch axis by engaging with a first set of the plurality of gear teeth. Thus, the secondary pinion is constructed of a deformable material. Furthermore, the secondary pinion may be mechanically connected to a rotational device, such as a double-rachet mechanism, and engages a second set of the plurality of gear teeth. Accordingly, the deformable material of the secondary pinion allows for backlash between the secondary pinion and the plurality of gear teeth to be eliminated (or negligible), thereby minimizing micro-pitching of the pitch assembly. Moreover, in an embodiment, the secondary pinion is configured to rotate only when a torque at the secondary pinion exceeds a torque threshold (e.g., such as a bearing starting torque) so as to minimize micro-pitching of the pitch assembly. In an embodiment, this torque value is already accounted for in the pitch drive mechanism calculation, hence no additional load is applied on the pitch drive mechanism.

Figure 1:
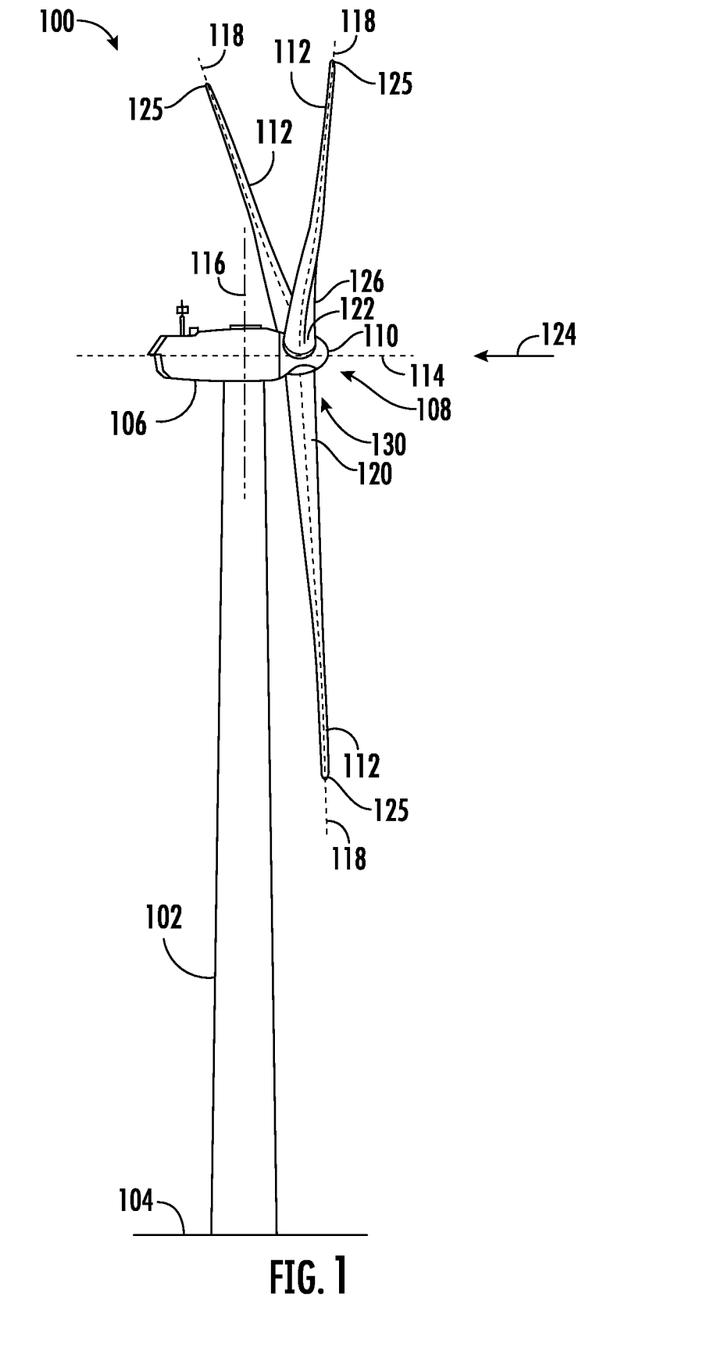
FIG. 1 illustrates a schematic view of an embodiment of a wind turbine according to the present disclosure.

Referring now to the drawings, FIG. 1 illustrates a schematic view of an embodiment of a wind turbine 100 according to the present disclosure. As shown, the wind turbine 100 is a horizontal-axis wind turbine. Alternatively, the wind turbine 100 may be a vertical-axis wind turbine. In an embodiment, the wind turbine 100 includes a tower 102 extending from and coupled to a supporting surface 104. The tower 102 is coupled to the supporting surface 104 by either anchor bolts or by a foundation mounting piece (neither shown). The wind turbine 100 further includes a nacelle 106 coupled to the tower 102, and a rotor 108 is coupled to the nacelle 106. The rotor 108 includes a rotatable hub 110 and a plurality of rotor blades 112 coupled to hub 110. In an embodiment, the rotor 108 includes three rotor blades 112. Alternatively, the rotor 108 may have any number of rotor blades 112 that enables the wind turbine 100 to function as described herein. Further, the tower 102 may be any suitable height or construction that enables the wind turbine 100 to function as described herein.

The rotor blades 112 are spaced about the hub 110 to facilitate rotating the rotor 108, thereby transferring kinetic energy from wind 124 into usable mechanical energy, and subsequently, electrical energy. Further, the rotor 108 and the nacelle 106 are rotated about the tower 102 on a yaw axis 116 to control the perspective of rotor blades 112 with respect to the direction of the wind 124. The rotor blades 112 are mated to the hub 110 by coupling a blade root portion 120 to the hub 110 at a plurality of load transfer regions 122. The load transfer regions 122 each have a hub load transfer region and a blade load transfer region (both not shown in FIG. 1). As such, the loads induced to the rotor blades 112 are transferred to the hub 110 by the load transfer regions 122. Each rotor blade 112 also includes a blade tip portion 125. As wind 124 contacts each rotor blade 112, blade lift forces are induced to each rotor blade 112 and rotation of rotor 108 about an axis of rotation 114 is induced as blade tip portions 125 are accelerated.

A pitch angle (not shown) of the rotor blades 112, i.e., an angle that determines a perspective of each rotor blade 112 with respect to a direction of the wind 124, may be changed by a pitch assembly 130. Specifically, increasing a pitch angle of rotor blade(s) 112 decreases an amount of blade surface area 126 exposed to the wind 124 and, conversely, decreasing the pitch angle of the rotor blade(s) 112 increases an amount of blade surface area 126 exposed to the wind 124. The pitch angles of the rotor blades 112 are adjusted about a pitch axis 118 for each rotor blade 112. In an embodiment, the pitch angles of rotor blades 112 are controlled individually. Alternatively, the pitch of rotor blades 112 may be controlled as a group.

Figure 2:
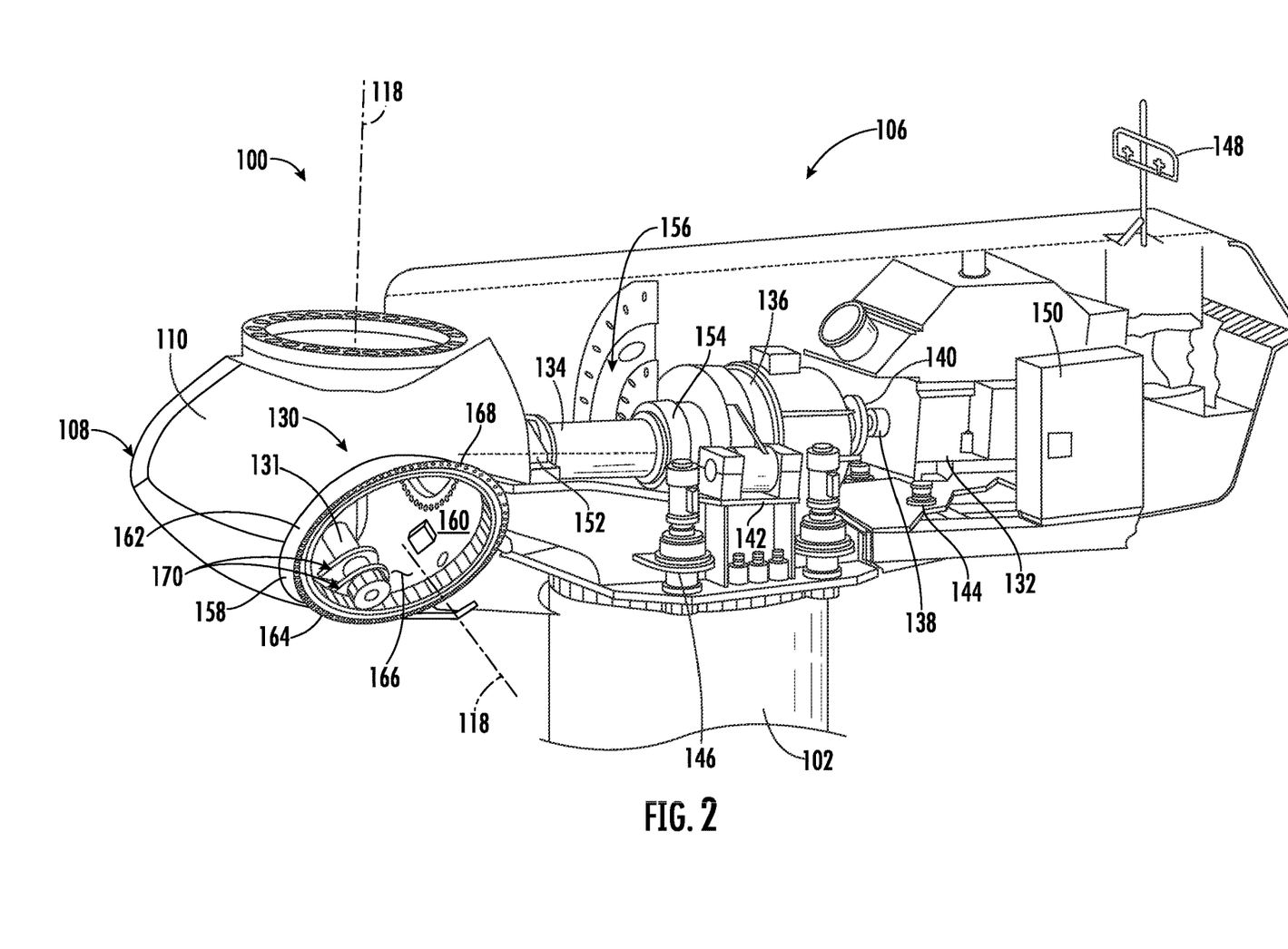
FIG. 2 illustrates a partial, internal view of an embodiment of a nacelle suitable for use with the wind turbine shown in FIG. 1.

Referring now to FIG. 2, a partial, internal view of an embodiment of the nacelle 106 of the wind turbine 100 is illustrated. Various components of wind turbine 100 are housed in the nacelle 106. In an embodiment, for example, the nacelle 106 includes three pitch assemblies 130 that are each coupled to a respective rotor blade 112 (shown in FIG. 1), wherein the pitch assembly 130 modulates the pitch of each respective rotor blade 112 along the pitch axis 118. Only one of three pitch assemblies 130 is illustrated in FIG. 2.

In an embodiment, each pitch assembly 130 includes at least one pitch drive motor 131. The pitch drive motor 131 is any motor driven by electrical power and/or a hydraulic system that enables the pitch assembly 130 to function as described herein. Alternatively, the pitch assembly 130 may include any suitable structure, configuration, arrangement, and/or components such as, but not limited to, hydraulic cylinders, springs, and/or servomechanisms. Moreover, the pitch assembly 130 may be driven by any suitable means such as, but not limited to, hydraulic fluid, and/or mechanical power, such as, but not limited to, induced spring forces and/or electromagnetic forces.

The nacelle 106 may also house an electric generator 132 rotatably coupled to the rotor 108 by a rotor shaft 134 (sometimes referred to as either a main shaft or a low-speed shaft), a gearbox 136, a high-speed shaft 138, and a coupling 140. As such, rotation of the rotor shaft 134 rotatably drives the gearbox 136 that subsequently drives the high-speed shaft 138. The high-speed shaft 138 rotatably drives the generator 132 with the coupling 140 and rotation of the high-speed shaft 138 facilitates production of electrical power by the generator 132. Further, as shown, the gearbox 136 and the generator 132 are supported by supports 142 and 144, respectively. In an embodiment, the gearbox 136 utilizes a dual path geometry to drive the high-speed shaft 138. Alternatively, the rotor shaft 134 may be coupled directly to the generator 132 with the coupling 140.

Still referring to FIG. 2, the nacelle 106 also includes a yaw drive mechanism 146 that may be used to rotate the nacelle 106 and the rotor 108 about the yaw axis 116 (FIG. 1) to control the perspective of the rotor blades 112 with respect to the direction of the wind 124. The nacelle 106 may also include at least one meteorological mast 148 that includes a wind vane and anemometer (neither shown in FIG. 2). Thus, in an embodiment, the mast 148 provides information to a turbine control system 150 that may include wind direction and/or wind speed. The pitch assembly 130 may also be coupled to the turbine control system 150 for control thereby.

In an embodiment, the nacelle 106 may also include main, or forward and aft, support bearings 152 and 154, respectively. The support bearings 152 and 154 facilitate radial support and alignment of the rotor shaft 134. More specifically, as shown, the forward support bearing 152 is coupled to the rotor shaft 134 near the hub 110, whereas the aft support bearing 154 is positioned on the rotor shaft 134 near the gearbox 136 and/or the generator 132. In further embodiments, the nacelle 106 may include any number of support bearings that enable the wind turbine 100 to function as disclosed herein. The rotor shaft 134, the generator 132, the gearbox 136, the high-speed shaft 138, the coupling 140, and any associated fastening, support, and/or securing device including, but not limited to, the supports 142 and 144, and the support bearings 152 and 154, are sometimes referred to as a drive train 156.

Furthermore, as shown, the hub 110 includes an outer wall 158 that includes an inner surface 160, an outer surface 162, and a bearing surface 164. The inner surface 160 defines a hub cavity 166. Accordingly, the pitch assembly 130 further includes a pitch bearing 168 and a plurality of pitch drive brackets 170 for positioning the pitch motor 131 adjacent to the pitch bearing 168. Thus, in an embodiment, the pitch bearing 168 is coupled to the outer wall 158 and to the rotor blade 112 (FIG. 1), for rotating the rotor blade 112 about the pitch axis 118. Specifically, in an embodiment, the pitch bearing 168 is coupled to outer wall 158 such that the pitch bearing 168 is positioned adjacent to the bearing surface 164. In an embodiment, the pitch drive brackets 170 are coupled to hub inner surface 160 such that the pitch motor 131 is positioned within the hub cavity 166. In an alternative embodiment, the pitch drive brackets 170 are coupled to the outer surface 162, such that the pitch motor 131 is positioned outside the hub 110.

Figure 3:
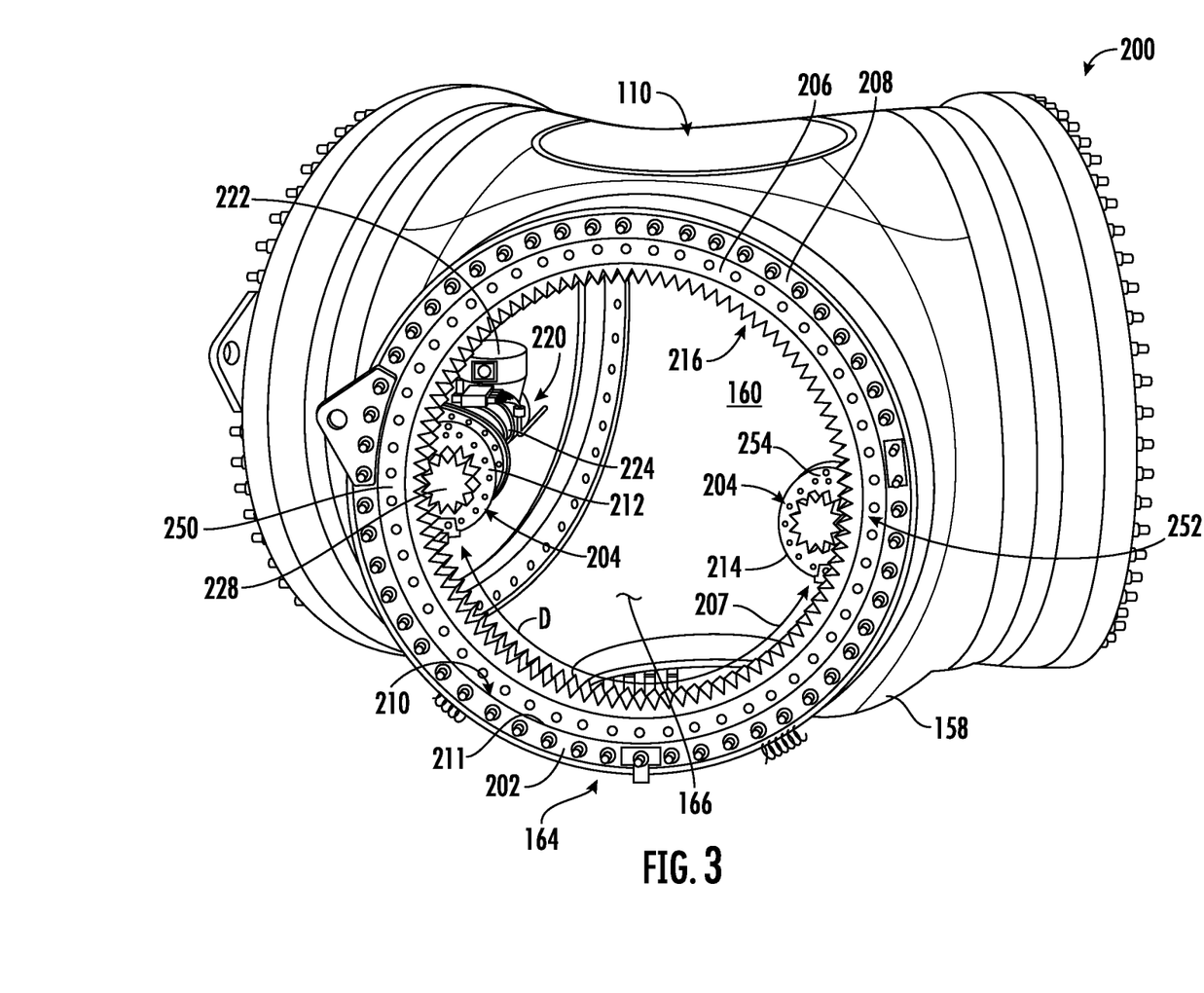
FIG. 3 illustrates a perspective view of an embodiment of a hub having a pitch assembly suitable for use with the wind turbine shown in FIG. 1.
Figure 4:
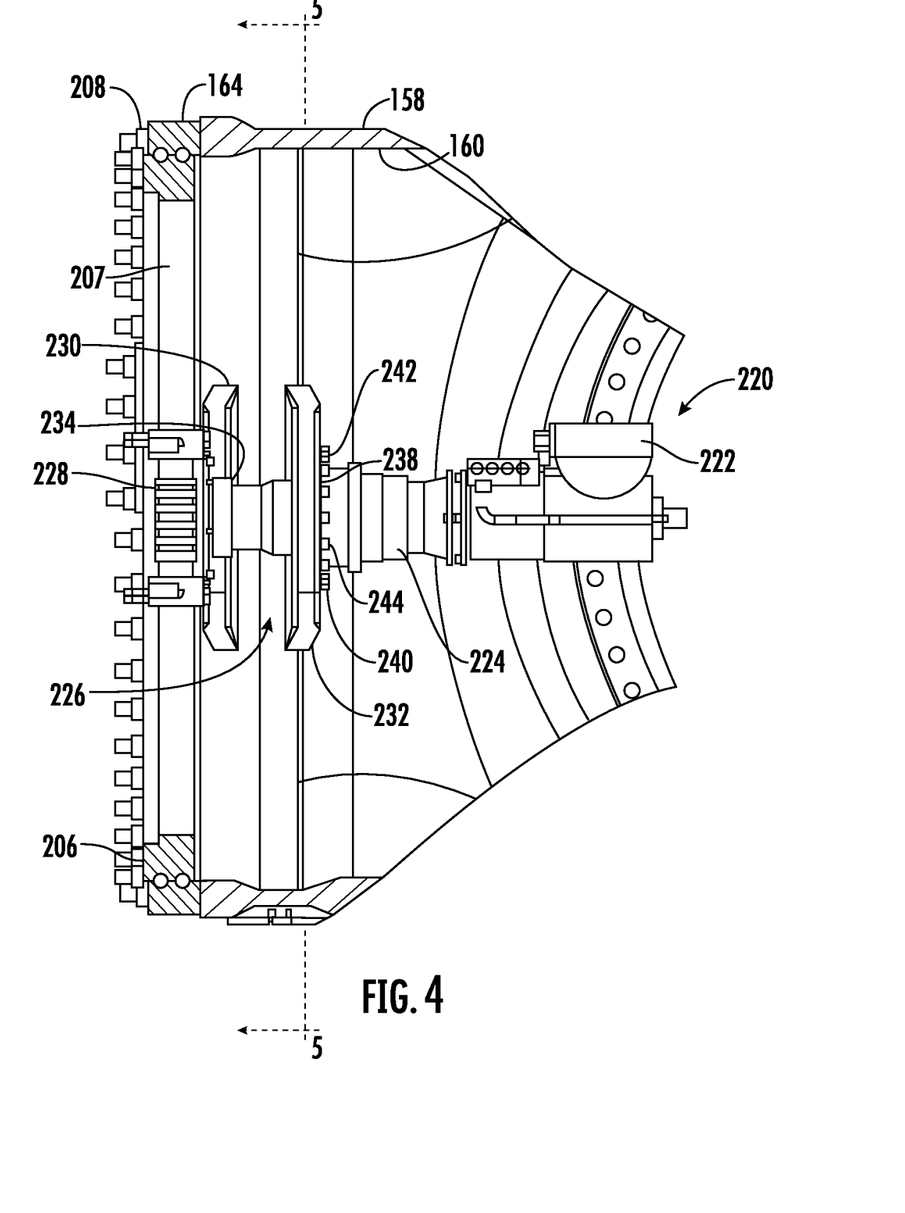
FIG. 4 illustrates an enlarged schematic view of an embodiment of a pitch drive bracket suitable for use with the pitch assembly shown in FIG. 3.
Figure 5:
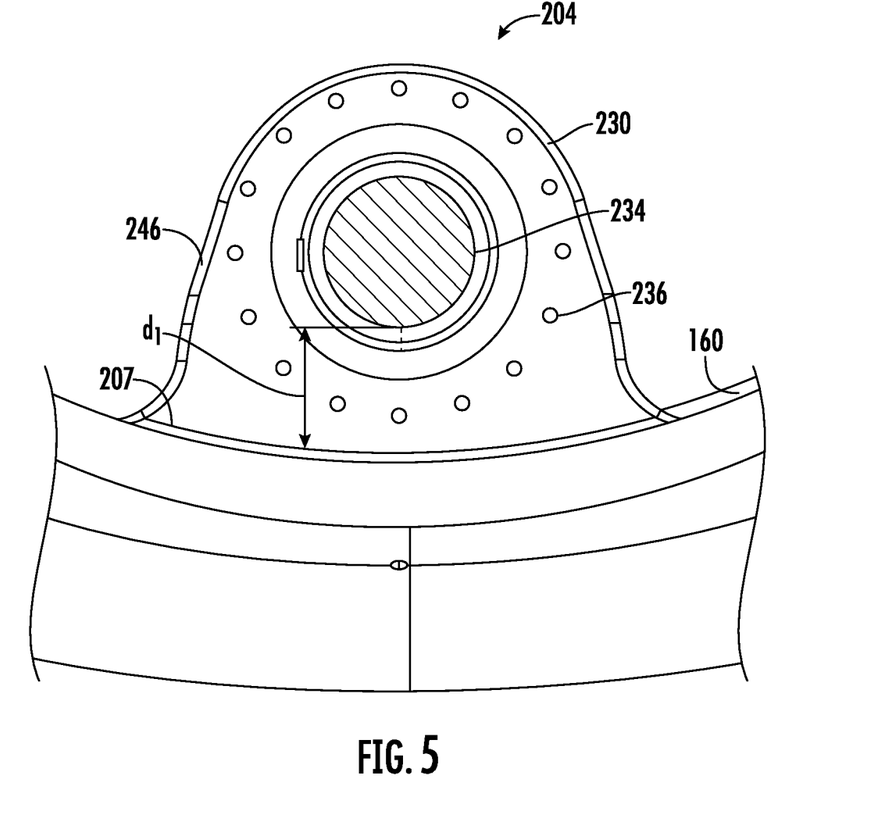
FIG. 5 illustrates an enlarged cross-sectional view of the pitch drive bracket of FIG. 4.

Referring now to FIG. 3, a perspective view of a pitch assembly 200 that is suitable for use in wind turbine 100 is illustrated according to the present disclosure. FIG. 4 is an enlarged cross-sectional view of the pitch assembly 200. FIG. 5 is an enlarged cross-sectional view of a pitch drive bracket 204 taken along line 5-5. In an embodiment, as shown, the pitch assembly 200 includes a pitch bearing 202 and at least two pitch drive brackets 204. The pitch bearing 202 is rotatably coupled to the outer wall 158 of the hub 110, such that the pitch bearing 202 is rotatable about the pitch axis 118.

The pitch bearing 202 includes an inner race 206 positioned radially inward to, and substantially concentric with, an outer race 208. The inner race 206 is rotatably coupled to the outer race 208 such that the inner race 206 rotates relative to the outer race 208 about the pitch axis 118. The outer race 208 is securely coupled to the outer wall 158 of the hub 110. More specifically, in an embodiment, the outer race 208 is coupled to the outer wall 158 of the hub 110 using a plurality of fasteners, such as bolts and nuts. Alternatively, the outer race 208 is coupled to the outer wall 158 of the hub 110 by methods that include, but are not limited to, retention hardware, welds, and/or sealing methods and apparatus known in the art.

In an embodiment, the outer race 208 is coupled to the outer wall 158 of the hub 110, such that the outer race 208 is in substantial contact with the bearing surface 164. In an embodiment, as shown, an annular groove 210 is defined between the inner race 206 and the outer race 208 that includes at least one material 211 that facilitates reducing friction between inner race 206 and outer race 208. For example, in an embodiment, the material 211 is at least one of bearing balls, rollers, or a lubricant.

Still referring to FIG. 3, the pitch assembly 200 may include a plurality of pitch drive brackets 204 positioned within the hub cavity 166. Further, as shown, the plurality of drive brackets 204 are coupled to the inner surface 160 of the hub 110. More specifically, in an embodiment, the pitch assembly 200 includes a first pitch drive bracket 212 and a second pitch drive bracket 214. In the illustrated embodiment, the first pitch drive bracket 212 is positioned substantially opposite the second pitch drive bracket 214 along a circumference 216 of the pitch bearing 202. In an alternative embodiment, the pitch assembly 200 includes a plurality of pitch drive brackets 204 that are equally spaced a circumferential distance D apart from each other about the pitch bearing 202. In another embodiment, the plurality of pitch drive brackets 204 are spaced at any distance that enables the pitch assembly 200 to function as described herein.

In an embodiment, the pitch drive brackets 204 are coupled to the inner surface 160 of the hub 110 using a weld, however, the pitch drive brackets 204 may be coupled to the inner surface 160 of the hub 110 by methods that include, but are not limited to, retention hardware, and sealing methods such that the pitch drive brackets 204 are securely coupled to the inner surface 160 of the hub 110. In a further embodiment, the pitch drive brackets 204 may be formed integral with the hub 110. One of the respective rotor blades 112 (shown in FIG. 1) is removably coupled to the inner race 206 using a plurality of bolts. Alternatively, the rotor blade 112 may be coupled to the inner race 206 using any methods known in the art that enable the rotor blade 112 to be removed from the inner race 206. It should be further understood that the rotor blade 112 may also be coupled to the outer race 208 using any methods known in the art that enable the rotor blade 112 to be removed from the outer race 208.

The pitch assembly 200 also includes a pitch drive mechanism 220 that includes a pitch drive motor 222, a pitch gearbox 224, a pitch drive shaft 226 (FIG. 4), and a primary pitch drive pinion 228. The pitch drive motor 222 is coupled to the pitch gearbox 224 such that the pitch drive motor 222 imparts mechanical force to the pitch gearbox 224. The pitch gearbox 224 is coupled to the pitch drive shaft 226 and the pitch drive shaft 226 is coupled to the primary pitch drive pinion 228, such that the primary pitch drive pinion 228 is rotated by the pitch gearbox 224, with the pitch drive shaft 226.

Furthermore, one of the inner race 206 or the outer race 208 may include a plurality of gear teeth 207. For example, as shown in the illustrated embodiment, the inner race 206 includes the plurality of gear teeth 207 spaced circumferentially about the inner race 206. As such, in an embodiment, during operation of the pitch drive mechanism 220, the primary pitch drive pinion 228 engages a first set 250 of the gear teeth 207 to translate rotational force from the pitch drive mechanism 220 to the pitch bearing 202. In other words, the first set 250 of the gear teeth 207 engage the primary pitch drive pinion 228 such that the rotation of the primary pitch drive pinion 228 causes rotation of the inner race 206 of the pitch bearing 202.

Moreover, as shown, the first pitch drive bracket 212 is coupled to the pitch drive mechanism 220, such that the first pitch drive bracket 212 supports the pitch drive mechanism 220 and retains the pitch drive mechanism 220 in a fixed position relative to the pitch bearing 202. More specifically, the first pitch drive bracket 212 is sized to receive the pitch drive mechanism 220 therein.

In an embodiment, the first pitch drive bracket 212 is substantially similar to the second pitch drive bracket 214. More specifically, as shown in FIG. 4, the first pitch drive bracket 212 may include a first member 230 and a second member 232. The first member 230 is coupled to the inner surface 160 of the hub 110 and extends substantially-radially inward from the inner surface 160. Further, the first member 230 includes a central opening 234 and a plurality of bores 236 (FIG. 5). The central opening 234 is positioned substantially concentric within the first member 230 and extends at least partially therethrough. The central opening 234 is sized and shaped to receive the pitch drive shaft 226 and the primary pitch drive pinion 228.

As shown in FIGS. 3 and 4, the primary pitch drive pinion 228 is rotatably coupled to the first member 230 and is positioned between the first member 230 and the pitch bearing 202. Thus, as shown, the primary pitch drive pinion 228 is inserted through the central opening 234 and is aligned concentric to the central opening 234. Further, in an embodiment, as shown in FIG. 5, the central opening 234 is positioned a distance d1 from the inner surface 160 of the hub 110 such that the primary pitch drive pinion 228 contacts the gear teeth 207. Moreover, as shown in FIG. 5, the bores 236 are positioned radially outward from the central opening 234 and are aligned substantially circumferentially about the central opening 234.

As shown generally in FIG. 4, the second member 232 is coupled to the inner surface 160 of the hub 110 and extends substantially-radially inward from the inner surface 160 and is aligned substantially perpendicular thereto. Further, the second member 232 includes a central opening 238 and a plurality of bores 240, and is aligned to the first member 230, such that the central opening 234 of the first member 230 is concentrically aligned with the central opening 238 of the second member 232. Further, as shown in FIG. 4, the second member 232 is positioned between the first member 230 and the pitch drive motor 222, such that the pitch drive shaft 226 is coupled to the first member 230 and the second member 232. Moreover, the central opening 238 is sized and shaped to receive the pitch drive shaft 226 and the pitch gearbox 224.

Furthermore, in an embodiment, the bores 240 of the second member 232 are circumferentially positioned about the central opening 238. In addition, as shown, the pitch gearbox 224 includes at least one opening 242 that is sized and shaped to receive at least one bolt 244. The bolt 244 is inserted through opening 242 and into a corresponding bore 240 to securely couple the pitch gearbox 224 to the second member 232, such that the first pitch drive bracket 212 facilitates reducing the pitch assembly 200 from moving relative to hub 110. In an embodiment, as shown particularly in FIG. 5, the first member 230 and the second member 232 include a bell-shaped flange 246. In an alternative embodiment, first member 230 and second member 232 may have any shape that enables pitch assembly 200 to operate as described herein.

In certain embodiments, the pitch drive mechanism 220 is coupled to the turbine control system 150 (FIG. 2) for adjusting the pitch angle of the rotor blade(s) 112 upon receipt of a signal from the turbine control system 150. The pitch drive motor 222 includes any suitable structure, configuration, arrangement, means, and/or components, such as, but not limited to, electrical motors, hydraulic cylinders, springs, and/or servomechanisms. Moreover, the pitch drive motor 222 is driven by any suitable means, such as, but not limited to, hydraulic fluid, electrical power, electro-chemical power, and/or mechanical power, such as, but not limited to, spring force. In some embodiments, the pitch drive motor 222 is driven by energy extracted from at least one of a rotational inertia of the rotor 108 and a stored energy source (not shown) that supplies energy to components of the wind turbine 100.

Accordingly, in an embodiment, the pitch drive mechanism 220 uses the pitch drive motor 222 to change the pitch angle of the rotor blades 112 by rotating the rotor blades 112 with respect to the hub 110 and the outer race 208 (or inner race 206). More specifically, in an embodiment, the primary pitch drive pinion 228 is coupled to the pitch bearing 202 such that rotation of the pitch drive mechanism 220 rotates the pitch bearing 202 and the respective rotor blade 112 about the pitch axis 118 to change the pitch of the rotor blade 112. During operation of the wind turbine 100, the pitch drive mechanism 220 rotates each rotor blade 112 a limited distance about the pitch axis 118, such that the primary pitch drive pinion 228 contacts a limited number of gear teeth 207.

As mentioned, in an alternative embodiment, the inner race 206 is securely coupled to the outer wall 158 of the hub 110 and is positioned in contact with the bearing surface 164. In such an embodiment, the outer race 208 is rotatably coupled to the inner race 206, such that the outer race 208 rotates relative to the inner race 206. In this alternative embodiment, the pitch drive brackets 204 are coupled to the outer surface 162 of the hub 110, such that the pitch drive mechanism 220 is positioned outside the hub cavity 166 and is coupled to the outer race 208. Further, in such an embodiment, the rotor blade 112 is coupled to the outer race 208, such that the pitch drive mechanism 220 rotates the rotor blade 112 about the pitch axis 118.

Referring back to FIG. 3, the pitch assembly 200 further includes a secondary pinion 254 engaging a second set 252 of the gear teeth 207 that is different than first set 250. Thus, the secondary pinion 254 is configured to rotate only when a torque at the secondary pinion 254 is exceeded by a torque threshold so as to minimize micro-pitching of the pitch assembly 200.

Figure 6:
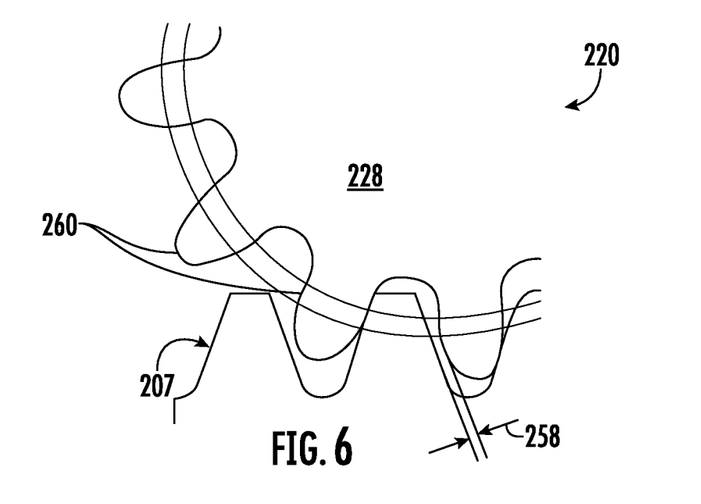
FIG. 6 illustrates a partial, schematic view of a primary pitch drive pinion of a pitch assembly engaging with gear teeth of a pitch bearing of the pitch assembly according to the present disclosure, particularly illustrating backlash between the primary pitch drive pinion and the gear teeth.

Referring particularly to FIG. 6, backlash (e.g., as indicated by a clearance 258 between gear teeth 260 of the primary pitch drive pinion 228 and the gear teeth 207) is required per assembly instruction of the pitch assembly 200. Such backlash, however, can cause micro-pitching, which causes damage to the pitch bearing 202. These micro-movements cannot be eliminated by the turbine control system 150. Thus, the secondary pinion 254 is provided to address minimizing such micro-pitching.

Figure 7:
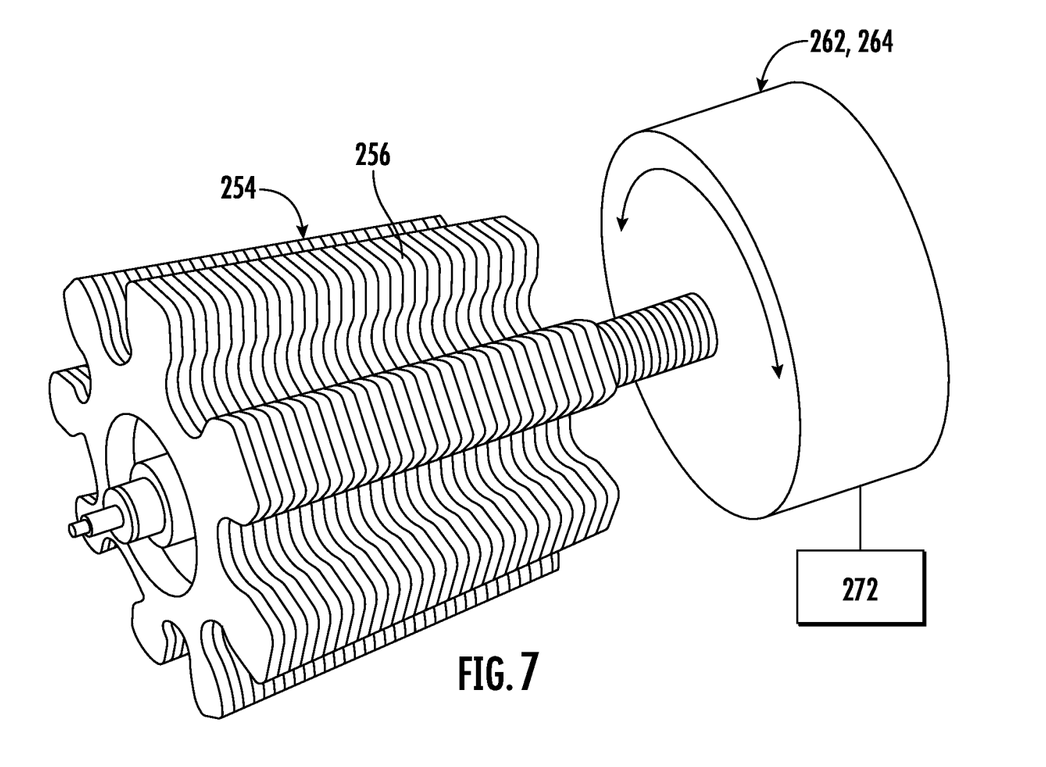
FIG. 7 illustrates a perspective view of an embodiment of a secondary pinion of a pitch assembly according to the present disclosure.

Referring particularly to FIG. 7, a perspective view of an embodiment of the secondary pinion 254 according to the present disclosure is illustrated. In particular, as shown, the secondary pinion 254 is mechanically coupled to a rotational device 262 for rotating the secondary pinion 254. For example, in an embodiment, the rotational device 262 may be a motor, a rachet mechanism, a spring mechanism, a crank, or a winch. More specially, in an embodiment, as shown in FIG. 7, the rotational device 262 is a rachet mechanism 264. In such embodiments, as an example, the rachet mechanism 264 may include a two-way rachet mechanism. Still referring to FIG. 7, in an embodiment, the secondary pinion 254 is constructed of a deformable material 256. For example, in an embodiment, the deformable material 256 may be an elastomer material or a foam material. In such embodiments, the deformable material 256 should be selected to still be stiff enough to prevent rotation of the pitch bearing 202.

Figure 8A:
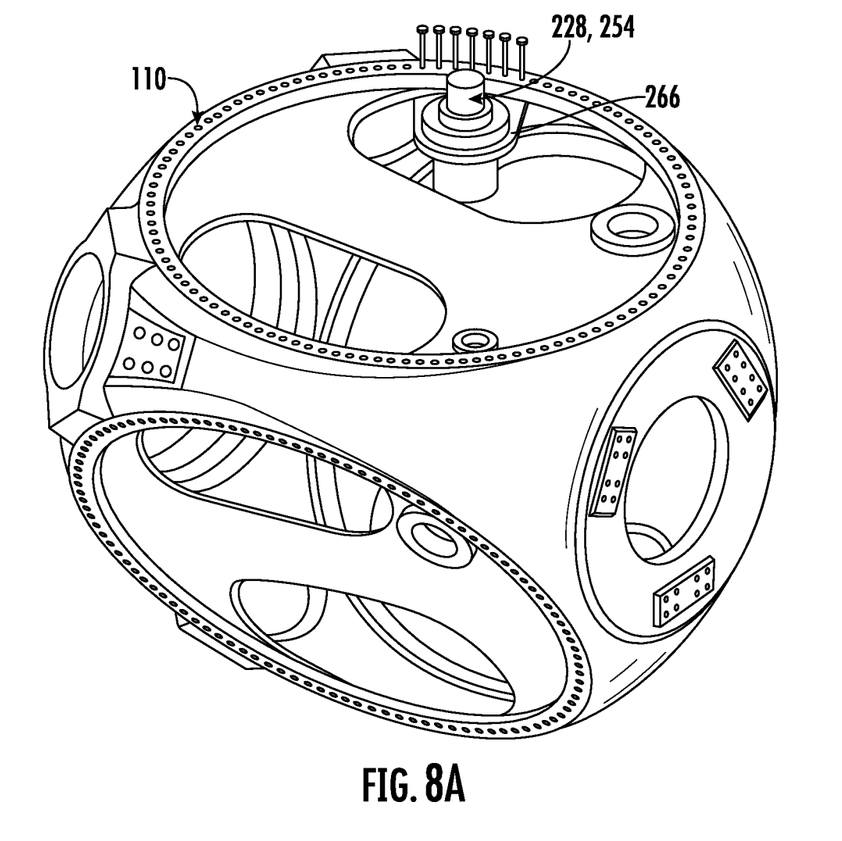
FIGS. 8A and 8B illustrates various views of a hub of a wind turbine according to the present disclosure, particularly illustrating mounting locations for first and second pitch drive pinions of a pitch assembly.
Figure 8B:
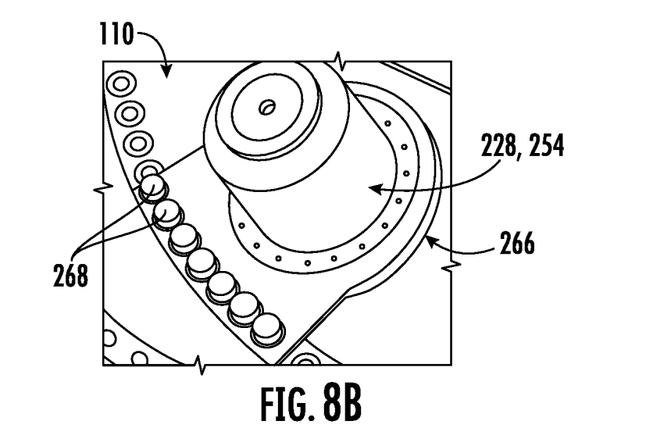
Figure 9:
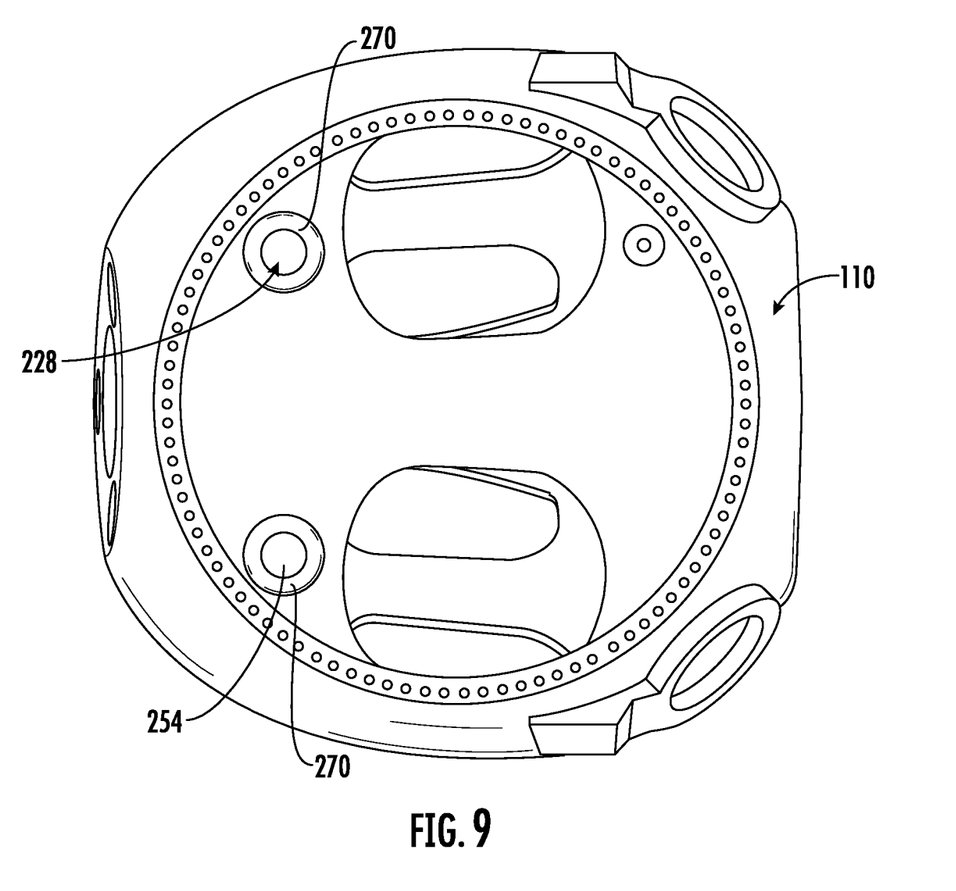
FIG. 9 illustrates a flow diagram of an embodiment of a method of minimizing micro-pitching of a pitch assembly of a wind turbine according to the present disclosure.

As mentioned, the primary pitch drive pinion 228 and the secondary pinion 254 are mounted to the hub 110 of the wind turbine 100. For example, referring now to FIGS. 8A-8B, the primary pitch drive pinion 228 and the secondary pinion 254 may be mounted to the hub 110 via an attachment plate 266 secured to the hub 110. More specifically, as shown in FIG. 8B, the primary pitch drive pinion 228 and the secondary pinion 254 may each separate extend through an opening of a respective attachment plate 266 and the attachment plate(s) 266 may in turn be secured to the hub 110, e.g., via one or more fasteners 268. It should be further understood that the attachment plate(s) 266 as described herein may be configured similar to the pitch drive brackets 204 described herein. In another embodiment, as shown in FIG. 9, rather than having separate attachment plate(s) 266/pitch drive brackets 204, the hub 110 may include one or more integral openings 270 configured to receive the primary pitch drive pinion 228 and the secondary pinion 254.

In another embodiment, as shown in FIG. 7, the pitch assembly 200 may include a disengagement device 272 that disengages the secondary pinion 254 or overrides the torque threshold when commanded by a controller, such as turbine controller 150. In such embodiments, the disengagement device 272 may include a clutch or a switch.

Figure 10:
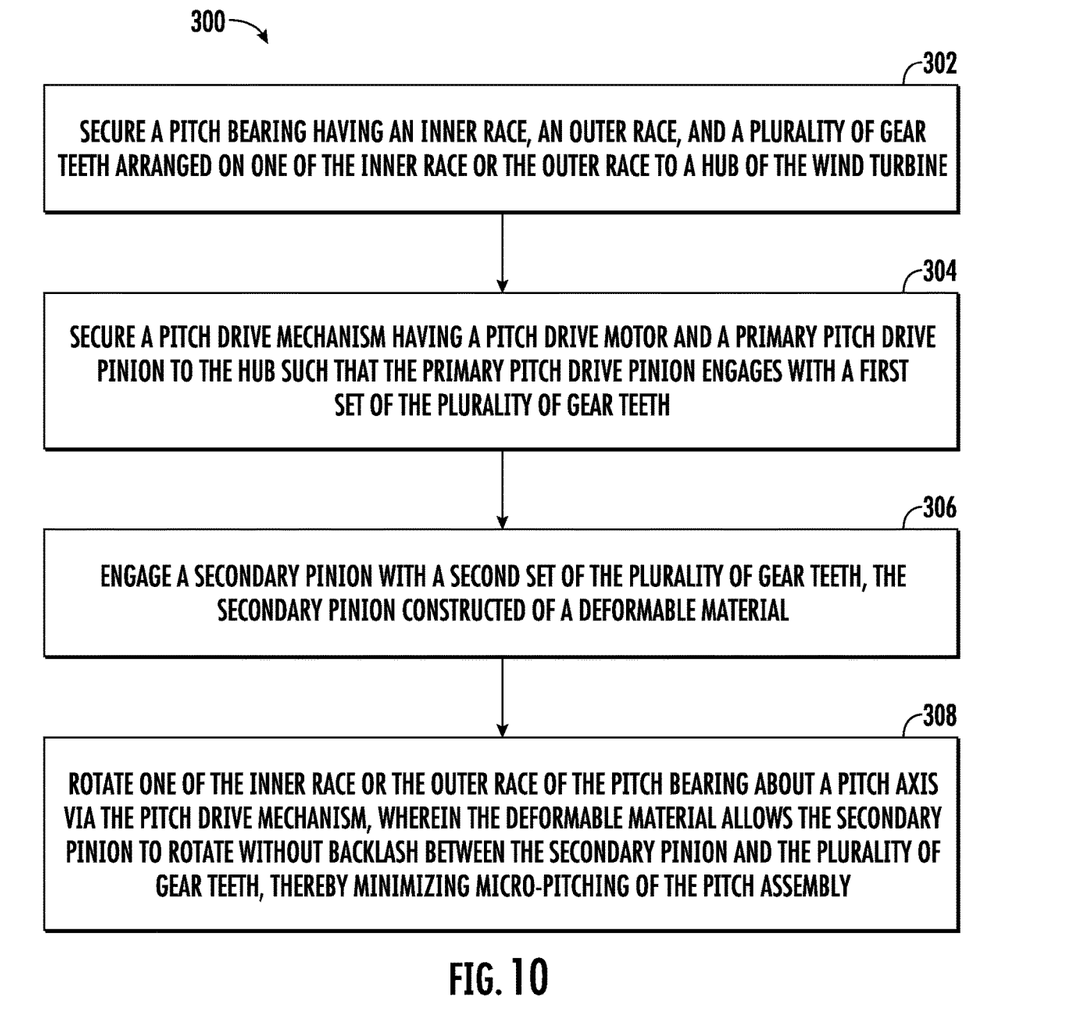
FIG. 10 illustrates a flow diagram of another embodiment of a method of minimizing micro-pitching of a pitch assembly of a wind turbine according to the present disclosure.

Referring now to FIG. 10, a flow diagram of an embodiment of a method 300 of minimizing micro-pitching of a pitch assembly of a wind turbine according to the present disclosure is illustrated. In general, the method 300 will be described herein with reference to the pitch assembly illustrated in FIGS. 1-9. However, it should be appreciated that the disclosed method 300 may be implemented with any pitch assembly having any other suitable configurations. In addition, although FIG. 10 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in numerous ways without deviating from the scope of the present disclosure.

As shown at (302), the method 300 includes securing a pitch bearing having an inner race, an outer race, and a plurality of gear teeth arranged on one of the inner race or the outer race to a hub of the wind turbine. As shown at (304), the method 300 includes securing a pitch drive mechanism having a pitch drive motor and a primary pitch drive pinion to the hub such that the primary pitch drive pinion engages with a first set of the plurality of gear teeth. As shown at (306), the method 300 includes engaging a secondary pinion with a second set of the plurality of gear teeth, the secondary pinion constructed of a deformable material. As shown at (308), the method 300 includes rotating one of the inner race or the outer race of the pitch bearing about a pitch axis via the pitch drive mechanism, wherein the deformable material allows the secondary pinion to rotate without backlash between the secondary pinion and the plurality of gear teeth, thereby minimizing micro-pitching of the pitch assembly. In addition, the method 300 may include monitoring a torque at the secondary pinion and rotating the secondary pinion when the torque at the secondary pinion exceeds a torque threshold, which may correspond to a bearing starting torque.

Exemplary embodiments of systems and methods of minimizing micro-pitching of a pitch assembly are described above in detail. The systems and methods are not limited to the specific embodiments described herein, but rather, components of systems and/or steps of the methods may be utilized independently and separately from other components and/or steps described herein. For example, the methods may also be used in combination with other wind turbine and are not limited to practice with only the wind turbine generator as described herein. Rather, the various embodiments can be implemented and utilized in connection with many other wind turbine applications.

Although specific features of various embodiment of the present disclosure may be shown in some drawings and not in others, this is for convenience only. In accordance with the principles of the present disclosure, any feature of a drawing may be reference and/or claimed in combination with any feature of any other drawing.

Further aspects of the present disclosure are provided by the subject matter of the following clauses:

A pitch assembly for a wind turbine, the pitch assembly comprising: a pitch bearing comprising an inner race, an outer race, and a plurality of gear teeth arranged on one of the inner race or the outer race: a pitch drive mechanism comprising a pitch drive motor and a primary pitch drive pinion, the primary pitch drive pinion configured to rotate one of the inner race or the outer race of the pitch bearing about a pitch axis by engaging with a first set of the plurality of gear teeth; and a secondary pinion engaging a second set of the plurality of gear teeth, the secondary pinion constructed of a deformable material such that backlash is eliminated between the secondary pinion and the plurality of gear teeth, thereby minimizing micro-pitching of the pitch assembly.

The pitch assembly of any preceding clause wherein the secondary pinion is configured to rotate only when a torque at the secondary pinion exceeds a torque threshold, the torque threshold corresponding to a bearing starting torque.

The pitch assembly of any preceding clause, further comprising a rotational device for rotating the secondary pinion.

The pitch assembly of any preceding clause, wherein the rotational device comprises at least one of a motor, a rachet mechanism, a spring mechanism, a crank, or a winch.

The pitch assembly of any preceding clause, wherein the rotational device comprises the rachet mechanism, the rachet mechanism comprises a two-way rachet mechanism.

The pitch assembly of any preceding clause, wherein the deformable material comprises one of an elastomer material or a foam material.

The pitch assembly of any preceding clause, wherein the primary pitch drive pinion and the secondary pinion are mounted to a hub of the wind turbine.

The pitch assembly of any preceding clause, further comprising an attachment plate secured to the hub, the secondary pinion being mounted to the hub of the wind turbine through the attachment plate.

The pitch assembly of any preceding clause, wherein the primary pitch drive pinion is received through a first pitch drive bracket of the hub and the secondary pinion is received through a second central opening of a second pitch drive bracket of the hub.

A method of minimizing micro-pitching of a pitch assembly of a wind turbine, the method comprising: securing a pitch bearing having an inner race, an outer race, and a plurality of gear teeth arranged on one of the inner race or the outer race to a hub of the wind turbine: securing a pitch drive mechanism having a pitch drive motor and a primary pitch drive pinion to the hub such that the primary pitch drive pinion engages with a first set of the plurality of gear teeth: engaging a secondary pinion with a second set of the plurality of gear teeth, the secondary pinion constructed of a deformable material; and rotating one of the inner race or the outer race of the pitch bearing about a pitch axis via the pitch drive mechanism, wherein the deformable material allows the secondary pinion to rotate without backlash between the secondary pinion and the plurality of gear teeth, thereby minimizing micro-pitching of the pitch assembly.

The method of any preceding clause, further comprising: monitoring a torque at the secondary pinion; and rotating the secondary pinion when the torque at the secondary pinion exceeds a torque threshold via a rotational device, wherein the rotational device comprises at least one of a motor, a rachet mechanism, a spring mechanism, a crank, or a winch.

The method of any preceding clause, wherein the deformable material comprises one of an elastomer material or a foam material.

A pitch drive mechanism for a wind turbine, the pitch drive mechanism comprising: a pitch drive motor; a primary pitch drive pinion configured to rotate one of an inner race or an outer race of a pitch bearing about a pitch axis by engaging with a first set of a plurality of gear teeth of one of the inner race or the outer race; and a secondary pinion configured to engage a second set of the plurality of gear teeth, the secondary pinion constructed of a deformable material such that backlash is eliminated between the secondary pinion and the plurality of gear teeth, thereby minimizing micro-pitching of the pitch assembly.

The pitch drive mechanism of any preceding clause, wherein the secondary pinion is configured to rotate only when a torque at the secondary pinion exceeds a torque threshold so as to minimize micro-pitching of the pitch drive mechanism.

The pitch drive mechanism of any preceding clause, further comprising a rotational device for rotating the secondary pinion, wherein the rotational device comprises at least one of a motor, a rachet mechanism, a spring mechanism, a crank, or a winch.

The pitch drive mechanism of any preceding clause, further comprising a disengagement device that disengages the secondary pinion or overrides the torque threshold when commanded by a controller.

The pitch drive mechanism of any preceding clause, wherein the deformable material comprises one of an elastomer material or a foam material.

The pitch drive mechanism of any preceding clause, wherein the primary pitch drive pinion and the secondary pinion are mounted to a hub of the wind turbine.

The pitch drive mechanism of any preceding clause, further comprising an attachment plate secured to the hub, the secondary pinion being mounted to the hub of the wind turbine through the attachment plate.

The pitch drive mechanism of any preceding clause, wherein the primary pitch drive pinion is received through a first pitch drive bracket of the hub and the secondary pinion is received through a second central opening of a second pitch drive bracket of the hub.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A pitch assembly for a wind turbine, the pitch assembly comprising:
   a pitch bearing comprising an inner race, an outer race, and a plurality of gear teeth arranged on one of the inner race or the outer race;
   a pitch drive mechanism comprising a pitch drive motor and a primary pitch drive pinion, the primary pitch drive pinion arranged at a first circumferential location of the pitch bearing, the primary pitch drive pinion configured to rotate one of the inner race or the outer race of the pitch bearing about a pitch axis by engaging with a first set of the plurality of gear teeth at the first circumferential location of the pitch bearing;
   a secondary pinion engaging a second set of the plurality of gear teeth at a second circumferential location of the pitch bearing, the first circumferential location being spaced apart from the second circumferential location by a circumferential distance, the secondary pinion constructed of a deformable material, wherein the deformable material of the secondary pinion eliminates backlash between the secondary pinion and the plurality of gear teeth, thereby minimizing micro-pitching of the pitch assembly,
   wherein the secondary pinion is held stationary via a device and only rotates when a torque at the secondary pinion exceeds a torque threshold, the torque threshold corresponding to a bearing starting torque.

2. The pitch assembly of claim 1, wherein the device comprises at least one of a motor, a ratchet mechanism, a spring mechanism, a crank, or a winch.

3. The pitch assembly of claim 2, wherein the device comprises the ratchet mechanism, the rachet mechanism comprises a two-way rachet mechanism.

4. The pitch assembly of claim 1, wherein the deformable material comprises one of an elastomer material or a foam material.

5. The pitch assembly of claim 1, wherein the primary pitch drive pinion and the secondary pinion are mounted to a hub of the wind turbine.

6. The pitch assembly of claim 5, further comprising an attachment plate secured to the hub, the secondary pinion being mounted to the hub of the wind turbine through the attachment plate.

7. The pitch assembly of claim 5, wherein the primary pitch drive pinion is received through a first pitch drive bracket of the hub and the secondary pinion is received through a second central opening of a second pitch drive bracket of the hub.

8. A method of minimizing micro-pitching of a pitch assembly of a wind turbine, the method comprising:

securing a pitch bearing having an inner race, an outer race, and a plurality of gear teeth arranged on one of the inner race or the outer race to a hub of the wind turbine;

securing a pitch drive mechanism having a pitch drive motor and a primary pitch drive pinion to the hub such that the primary pitch drive pinion engages with a first set of the plurality of gear teeth at a first circumferential location of the pitch bearing;

engaging a secondary pinion with a second set of the plurality of gear teeth at a second circumferential location of the pitch bearing, the first circumferential location being spaced apart from the second circumferential location by a circumferential distance, the secondary pinion constructed of a deformable material; and rotating one of the inner race or the outer race of the pitch bearing about a pitch axis via the pitch drive mechanism, wherein the deformable material of the secondary pinion eliminates backlash between the secondary pinion and the plurality of gear teeth, thereby minimizing micro-pitching of the pitch assembly, monitoring a torque at the secondary pinion;

holding, via a device, the secondary pinion stationary and allowing the secondary pinion to only rotate when the torque at the secondary pinion exceeds a torque threshold, the torque threshold corresponding to a bearing starting torque.

9. The method of claim 8, wherein the device comprises at least one of a motor, a ratchet mechanism, a spring mechanism, a crank, or a winch.

10. The method of claim 8, wherein the deformable material comprises one of an elastomer material or a foam material.

11. A pitch drive mechanism for a wind turbine, the pitch drive mechanism comprising:

a pitch drive motor;

a primary pitch drive pinion configured to rotate one of an inner race or an outer race of a pitch bearing about a pitch axis by engaging with a first set of a plurality of gear teeth at a first circumferential location of the pitch bearing of one of the inner race or the outer race; and a secondary pinion configured to engage a second set of the plurality of gear teeth at a second circumferential location of one of the inner race or the outer race, the first circumferential location being spaced apart from the second circumferential location by a circumferential distance, the secondary pinion constructed of a deformable material, wherein the deformable material of the secondary pinion eliminates backlash between the secondary pinion and the plurality of gear teeth, thereby minimizing micro-pitching of the pitch assembly, wherein the secondary pinion is held stationary and is only allowed to rotate when a torque at the secondary pinion exceeds a torque threshold, the torque threshold corresponding to a bearing starting torque.

12. The pitch drive mechanism of claim 11, further comprising a device for controlling movement of the secondary pinion, wherein the device comprises at least one of a motor, a ratchet mechanism, a spring mechanism, a crank, or a winch.

13. The pitch drive mechanism of claim 11, further comprising a disengagement device that disengages the secondary pinion or overrides the torque threshold when commanded by a controller.

14. The pitch drive mechanism of claim 11, wherein the deformable material comprises one of an elastomer material or a foam material.

15. The pitch drive mechanism of claim 11, wherein the primary pitch drive pinion and the secondary pinion are mounted to a hub of the wind turbine.

16. The pitch drive mechanism of claim 15, further comprising an attachment plate secured to the hub, the secondary pinion being mounted to the hub of the wind turbine through the attachment plate.

17. The pitch drive mechanism of claim 15, wherein the primary pitch drive pinion is received through a first pitch drive bracket of the hub and the secondary pinion is received through a second central opening of a second pitch drive bracket of the hub.

* * * * *